United States Patent Office 3,215,670
Patented Nov. 2, 1965

3,215,670
POLYMERS OF ALKENYL EPOXYHYDROCARBYL ETHERS AND CONJUGATED DIOLEFINS, AND CURED PRODUCTS OBTAINED THEREFROM
Edward C. Shokal, Walnut Creek, and Paul A. Devlin and De Loss E. Winkler, Orinda, Calif., assignors to Shell Oil Company, New York, N.Y., a corporation of Delaware
No Drawing. Filed May 12, 1961, Ser. No. 109,498
16 Claims. (Cl. 260—63)

This invention relates to a new class of polyepoxides. More particularly, the invention relates to new polyepoxides prepared from alkenyl epoxy ethers and to cured products prepared therefrom.

Specifically, the invention provides new and particularly useful polyepoxides comprising addition copolymers of an alkenyl epoxy ether and a polyethylenically unsaturated compound, and preferably a conjugated diolefin. As a special embodiment the invention provides a new group of terpolymers having outstanding properties, particularly in the preparation of coatings. These new terpolymers comprise addition polymers of an alkenyl epoxy ether, a polyethylenically unsaturated compound and a dissimilar liquid material having an active hydrogen attached to carbon, and preferably mesityl oxide.

The invention further provides cured products obtained by reacting the above-described new polyepoxides with epoxy curing agents such as amines, acids, anhydrides, Friedel-Crafts catalyst and the like.

This application is a continuation-in-part of our co-pending application Serial No. 723,096, filed March 24, 1958, now U.S. Patent No. 3,040,010, which, in turn, is a continuation-in-part of our application Serial No. 34,346, filed June 21, 1948, now U.S. Patent No. 2,585,-506, and Serial No. 163,778, filed May 23, 1950, now U.S. Patent No. 2,839,514.

It is an object of the invention to provide a new class of polyepoxides. It is a further object to provide new polyepoxides that can be cured with epoxy resin curing agents to form hard and highly flexible castings. It is a further object to provide new polyepoxides that can be used as binders for rocket fuels. It is a further object to provide new polyepoxides that can be used to form superior surface coatings. It is a further object to provide new glycidyl ethers that can be utilized to form new polymeric curing agents for other polyepoxides. These and other objects of the invention will be apparent from the following detailed description thereof.

It has now been discovered that these and other objects can be accomplished by the new copolymers of the present invention comprising the product of polymerization of an alkenyl epoxy ether and a polyethylenically unsaturated compound and preferably a conjugated diene. It has been found that these copolymers have outstanding properties which make them particularly useful and valuable in industry. It has been found, for example, that these copolymers can be cured with curing agents such as polyamines to form strong castings which have excellent flexibility and distensibility. This makes the new products particularly useful as binders for rocket fuels. In this application the new copolymers are mixed with the appropriate curing agent and an oxidizer utilizes as a fuel such as ammonium perchlorate or ammonium nitrate and the mixture heated to effect a cure of the copolymer. The resulting products are tough and have excellent flexibility over a wide range of temperatures.

The new terpolymers of the invention comprise the product of polymerization of alkenyl epoxy ether, the polyethylenically unsaturated compound and a liquid material having an active hydrogen attached to carbon, such as mesityl oxide, have also been found to have outstanding properties. In addition to their above-described useful rocket fuel binders they may be used in the preparation of superior surface coating compositions. In this application they may be cured with epoxy curing agents as polyamines to form hard tough coatings which have good flexibility and excellent resistance to chemicals and water. Further advantage is found in the fact that coatings have excellent resistance to loss of gloss and improved resistance to discoloration.

The alkenyl epoxy ethers used in making the polymers of the invention include those of the formula R—O—X wherein R is an alkenyl radical and X is an epoxy-substituted hydrocarbon radical, and preferably an epoxyalkyl or epoxycycloalkyl radical as a glycidyl radical. Allyl glycidyl ether is the preferred monomer to be used, but other monomers having this formula may also be employed if desired. The related monoethers may contain any alkenyl group, such as a vinyl propenyl, isopropenyl, methallyl, crotyl, 3-butenyl or oleyl radical, for example, there being no restriction on the position of the double bond, the number of carbon atoms or the isomeric structure thereof. Examples of the epoxy-substituted hydrocarbon radicals include, among others, glycidyl, 1-methylglycidyl, 1-butylglycidyl, 2-methyl-glycidyl, 2-isopropylglycidyl, 2-hexylglycidyl, 3-methyl-glycidyl, or 3-isopentylglycidyl radicals, and 2,3-epoxy-cyclohexyl, 3,4-epoxycyclohexyl, 3,4-epoxybutyl and the like. Representative, but non-limiting, compounds employed as essential constitutents in preparing the copolymers of the invention include allyl glycidyl monoether, allyl epoxycyclohexyl ether, methallyl glycidyl monoether, crotyl glycidyl monoether, tiglyl glycidyl monoether, vinyl glycidyl monoether, isopropenyl glycidyl monoether, 4-pentenyl glycidyl monoether, 3-butene-2-yl glycidyl monoether, allyl 2-methylglycidyl monoether, methallyl 3-isopropylglycidyl monoether, vinyl 2-ethylglycidyl monoether, oleyl 3-methylglycidyl monether, and the like. A desirable sub-group of the general class is an alkenyl glycidyl monoether having the olefinic double bond between the second and third carbon atoms of the alkenyl group with the third carbon atom being the carbon atom of a terminal methylene group, which monoether contains 6 to 10 carbon atoms. More generally, it is preferred that the alkenyl group of the monoether have the olefinic double bond joined to the second carbon atom thereof owing to greater ease of polymerizing compounds of such structure than with compounds having the olefinic double bond more remotely situated from the ethereal oxygen atom.

The monomer to be copolymerized with the above-described alkenyl epoxy ether comprises the polyethylenically unsaturated compounds, such as, for example, poly-unsaturated hydrocarbons, polyunsaturated halo-substituted hydrocarbons, as the alkenyl esters of polycarboxylic acids and the alkenoic acid esters of polyhydric alcohols, ethers, a dialkenyl ether, and the like. Examples of these include, among others, open-chain and cyclic conjugated diolefins as isoprene, butadiene, chloroprene, 2-cyanobutadiene, and the like as well as divinylbenzene, diallyl and related materials, diallyl phthalate, diallyl ether, divinyl succinate, divinyl phthalate, allyl vinyl phthalate, ethylene glycol diacrylate, glycerol trimeth-acrylate, triallyl ether of glycerol, divinyl ether of ethylene glycol and the like. Particularly preferred monomers to be employed include the conjugated dienes containing up to 8 carbon atoms. The conjugated dienes containing from 4 to 6 carbon atoms and at least one terminal $CH_2$=C= group come under special consideration because of the superior properties of the resulting copolymers.

The new polymers of the present invention may be prepared by a variety of different techniques. They are preferably prepared by heating and reacting the alkenyl epoxy ether and the polyunsaturated compound together in the presence of a free radical yielding catalyst, and also preferably in the presence of a material possessing an active hydrogen as described hereinafter.

The free radical yielding catalysts employed in the process are preferably the peroxide catalysts, i.e., catalysts having an oxygen atom linked directly to another oxygen atom, and preferably those which are not more acidic than acetic acid. Examples of these catalysts include, among others, benzoyl peroxide, acetyl peroxide, cumene hydroperoxide, lauroyl peroxide, tertiary-butyl hydroperoxide, ditertiary-butyl peroxide, 2,2-bis(tertiary-butyl peroxy)butane, dicumyl peroxide, di-tert-amyl peroxide, and peresters, such at tert-butyl peracetate, tert-butyl perbenzoate and the like, as well as molecular oxygen, relatively pure or diluted with inert gas, e.g., nitrogen, methane, etc. When using peroxides, about 0.1% to 5% is suitable, although larger or smaller proportions may be employed if desired. Molecular oxygen is used as catalysts by bubbling or dispersing the gas into and through the liquid polymerization mixture.

Materials which contain active hydrogen attached to carbon may also be included in the polymerization mixture to modify the product. Examples of such materials include liquid hydrocarbons, such as vinylcyclohexene-1, d-limonene and the like, as well as substituted monomers, as mesityl oxide. This latter compound is particularly outstanding as it enters the molecule of the copolymer to give terpolymers having particularly outstanding properties as surface coatings.

The amount of the material having the active hydrogen attached to carbon employed in the process will vary over a wide range depending on the molecular weight of the polymer desired and, in the case of materials, as mesityl oxide, the properties desired in the finished product. In general, the amount of these materials will vary from about 1 to 100 mols of the material to be polymerized and preferably from 5 to 100 mols per mol of monomer. It is preferred to maintain this ratio during the course of the polymerization by adding the said material intermittently or continuously during the course of the reaction.

Depending upon the use to which the copolymer is put, the proportion of the alkenyl epoxy monoether to the polymerizable compound or compounds is varied to considerable extent in the mixture subjected to copolymerization. In some cases, it is desirable to have a copolymer with a large epoxide content while in others, the epoxide content is desired to be low. Preferably, the copolymer should contain at least 2% by weight of the alkenyl epoxy ether, and still more preferably from 5% to 90% by weight of the alkenyl epoxy ether. The polyethylenically unsaturated monomer preferably makes up at least 10% by weight of the polymer, and more preferably from 10% to 98% by weight of the polymer. Copolymers having outstanding properties, particularly in the formation of surface coatings, are those containing from 10% to 60% by weight of the alkenyl epoxy ether and from 40% to 90% by weight of the polyethylenically unsaturated compounds, such as the conjugated dienes.

As to the desired terpolymers prepared from mixtures containing the liquid having active hydrogen attached to carbon, the preferred polymers are those containing from about 2% to 30% by weight of the epoxy ether, about .5% to 30% by weight of the material having the active hydrogen attached to carbon and from 97.5% to 40% by weight of the polyethylenically unsaturated compound. Preferably for applications as coatings, the polymeric product should contain from 3% to 30% by weight of the epoxy ether, .5% to 20% by weight of the material having active hydrogen attached to carbon and 96.5% to 50% by weight of the polyethylenically unsaturated monomer.

In the preferred method of operation, the alkenyl epoxy ether and polyethylenically unsaturated compound are combined together, the catalyst added and the mixture heated to the desired temperature. When the liquid material containing the active hydrogen is employed, it is generally preferred to add the alkenyl epoxy ether and the polyethylenically unsaturated compound to the liquid containing the active hydrogen, add the catalyst and heating. In some cases when operating with materials, such as butadiene, that compound may be introduced as a gas.

In operation of the process, it may also be desirable to add one or more of the components during the course of the polymerization. This procedure is especially useful with mixtures wherein one compound polymerizes at a much faster rate than the other. In some cases, the faster polymerizing compound is added continuously or intermittently during the course of the polymerization.

The polymerization is preferably conducted at temperatures ranging from 50° C. to 250° C. Ordinary reflux temperature is often convenient although this temperature is usually too low to effect the copolymerization with desired rapidity. Consequently, it is usually preferable to operate at about 125° C. to 250° C., at which temperatures it may be desirable to employ superatmospheric pressure, such as from 100 to 300 pounds per square inch or even higher in order to keep the polymerizing mixture in liquid phase.

In preparing the copolymers, the polymerization of the entire monomer mixture is ordinarily not carried to completion. Instead, copolymerization is usually continued until about 10% to 80% of the monomer mixture is converted to copolymer and then the unpolymerized monomers are separated from the formed copolymer by distillation, preferably under reduced pressure. The copolymer obtained in this manner is substantially free of unpolymerized monomers, and solvents, if the latter are employed. If the polymeric product is to be used in the preparation of surface coatings where solvents can be utilized, it may be desirable to use the polymer in the solvent medium without separation as noted above.

The preparation process can be conducted in a batchwise, semi-continuous or continuous manner. In continuous operation, the mixture of monomers, catalyst, etc. may be continuously passed through a hot tube and then into column for separation of the solvent, etc., with the solvent and unreacted monomer being recycled to the reaction zone. The technique is preferred for commercial operations where uniformity of product is essential.

The new polymeric products of the invention will vary from liquids to soft or brittle solids, with the preferred products being in the liquid form. The new products have low molecular weights, e.g., molecular weights below about 25,000, and preferably between 500 and 10,000. The molecular weights are determined ebullioscopically in solvents, such as toluene. The new products are soluble in conventional hydrocarbon solvents, such as toluene, benzene, and the like, and compatible with various natural and synthetic oils, resins, tars and pitches, such as, for example, urea-aldehyde, phenol-aldehyde resins, melamine resins, coal tars, coal tar pitches, drying oils, and the like.

The new products will contain active ethylenic groups and may be reacted through these groups with other materials, and particularly with polyfunctional materials as noted hereinafter to effect a cross-linking of the product to form insoluble infusible products.

The copolymers of the invention contain unaltered epoxy groups of the epoxy monoether so that the copolymers have an epoxide value of from 0.01 equivalent of epoxide per 100 grams up to 80% of the theoretical epoxide value of the epoxy monoether. Copolymers with up to 50% of the theoretical value have excellent properties. The copolymers thus possess an appreciable amount of epoxide content while at the same time they also contain chemically combined in the macromolecules thereof, a substantial proportion of polymerizable compound or compounds other than are derived from the alkenyl epoxy ether and thereby have their properties favorably changed to an unexpected extent.

In those cases of the copolymers of the alkenyl epoxy ethers and conjugated dienes, the copolymers with excellent properties have epoxide values from about 0.1 to 0.6 epoxide equivalent per 100 grams of copolymer.

The epoxide value referred to herein as so many epoxide equivalents per 100 grams of polymer is determined in the following manner. Dry halogen chloride gas in amount of about 35 grams is slowly bubbled into and absorbed by a solution of 75 grams pyridine in 500 ml. dry chloroform cooled in an ice-water batch. After the absorption, a sample of the solution is titrated with standardized 0.5 N methanol solution, of NaOH, and then pyridine sufficient to neutralize free HCl, if any, is added to the solution so about a 5% excess of pyridine is present. The solution is then diluted with chloroform to one liter and the normality checked by titration. To determine the epoxide value of a copolymer, a stoichiometric excess of the standardized pyridinium chloride solution is added to a weighed sample of copolymer and the mixture is boiled under a reflux condenser for 30 minutes whereby the pyridinium chloride hydrochlorinates the epoxy groups to chlorohydrin groups. After cooling, the excess pyridinium chloride is back titrated with the standardized 0.5 N methanolic sodium hydroxide to the phenolphthalein end point. The epoxide value is calculated by considering one HCl of the reacted pyridinium chloride as equivalent to one epoxide group.

The new polymers can be converted to insoluble infusible products with epoxy curing agents. Examples of these include, among others, amines, amino-containing polymers, polybasic acids, acid anhydrides, salts, mercaptains, hydrazines, BF$_3$-complexes, and the like, and mixtures thereof. Specific examples of such materials include, among others, p-phenylene diamine, diaminodiphenyl-sulfone, p,p'-methylene dianiline, p,p-diaminodiphenylmethane, triaminobenzene, 2,4-diaminotoluene, tetraaminobenzene, 3,3'-diamino diphenyl, 1,3-diamino-4-isopropylbenzene, 1,3-diamino-4,5-diethylbenzene, diaminostilbene, triethylamine, ethylene diamine, diethylamine, diethylene triamine, triethylene tetramine, tetraethylene pentamine, pyridine, diaminopyridine, piperidine, N,N'-diethyl-1,3-propane-diamine, dicyandiamide, melamine, fatty acid salts of amines, such as the 2-ethylhexoate of tris(dimethylaminomethyl)phenol, adducts of polyepoxides, such as those described hereinafter, and the above-described mono- and polyamines, as the adduct of p-phenylene diamine and styrene oxide, the adduct of p-phenylene diamine and allyl glycidyl ether, the adduct of diglycidyl ether of 2,2-bis(4-hydroxyphenyl)propane and diethylene triamine, the adducts of diethylene triamine and ethylene oxide, the adduct of diethylene triamine and styrene oxide, the adducts of polyamines and unsaturated nitriles, such as the adduct of diethylene triamine and arcylonitrile, the adduct of diethylene triamine and unsaturated sulfolanes, and the adduct of p-phenylene diamine and acrylonitrile.

Other examples include the amino-containing polyamides as described in U.S. Patent No. 2,450,940 and the monomeric amides described in U.S. Patent No. 2,832,799.

Other examples include the acid anhydrides, such as phthalic anhydride, succinic anhydride, dodecenylsuccinic anhydride, maleic anhydride, tetrahydrophthalic anhydride, pyromellitic anhydride, hexachlorophthalic anhydride, methyl Nadic anhydride, anhydrides obtained by reacting maleic anhydride with unsaturated compounds, such as oils, terpinene, long chain unsaturated acids and the like as well as anhydrides obtained by reacting long chain acids with acetic anhydride, and the like.

Still other examples include the salts, such as magnesium perchlorate, zinc fluoborate, potassium persulfate, copper fluoborate, cupric arsenate, zinc persulfate, cupric fluosilicate, cupric iodate, cupric sulfate, magnesium nitrate, magnesium phosphate, stannic fluoborate, zinc nitrate, and the like, as well as the chloride derivatives as aluminum chloride, zinc chloride, ferric chloride and the like.

Still other examples include the BF$_3$ adducts with various materials, such as amines, amides, ethers, phenols and the like.

The amount of the curing agents employed will also vary over a wide range. The amount of the curing agents having active hydrogen as well as the agents such as acid anhydrides are preferably employed so as to furnish at least .6 equivalent, and still more preferably, .8 to 1.5 equivalents per equivalent of the polyepoxide. As used herein in relation to the amount of curing agent, "equivalent" means that amount needed to furnish 1 active hydrogen or anhydride group per epoxy group. The other curing agents, such as metal salts, tertiary amines, BF$_3$, and the like are preferably used in amounts varying from about .1% to 6% by weight of the material being cured.

The copolymers and curing agent may be mixed together alone or with a diluent or solvent. Various solvents that are suitable for achieving fluidity of the polyepoxide mixtures include, among others, ketones like acetone, methyl ethyl ketone, methyl isobutyl ketone, isophorone, etc., esters such as ethyl acetate, butyl acetate. Cellosolve acetate (ethylene glycol monoacetate), methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate or liquid monoepoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The new copolymers of the invention may be used for a great variety of important applications. As noted above, they are particularly useful in the preparation of surface coating compositions. The surface coatings may be those which are cured at room temperature or those which are cured by the application of heat, such as baking enamels. In this application, it is generally desirable to combine the copolymer with the desired solvent or other film forming materials and/or pigments and the necessary curing agents and then applying this mixture to the surface to be coated. The coatings may be allowed to set at room temperature or heated according to the type of curing agent employed. Coatings may be applied to a great variety of surfaces, such as wood, metals, plaster, concrete and the like. As noted above, the coatings are particularly superior for use in outdoor applications because they give films which have good resistance to loss of gloss, resistance to chalking, and good resistance to discoloration by ultraviolet light.

The copolymers of the invention may also be used in other applications, such as in the application of casting and moldings and for the incapsulation of electrical equipment that are used in the preparation of laminated articles and are also useful for the preparation of metal-to-metal adhesives.

The new copolymers of the invention are also useful in the preparation of curing agents for use with other polyepoxide materials. In this application, they are reacted with in control proportions material, such as mono- or polyamines, polycarboxylic acids, H$_2$S, monomercaptans, polymercaptans, and the like, to form new derivatives that can be further reacted with polyepoxides.

The new polymers may also be used as binders for rocket fuels. In this application, they are combined with an epoxy curing agent and desired oxidizer, such as ammonium perchlorate, and the mixture then cured, preferably under application of heat at a temperature of 50° C. to 90° C., until the desired flexible casting has been obtained.

The new polymers may also be cured through the double bonds by addition of free-radical catalysts as peroxides and then heating to temperatures, such as 60° C. to 200° C. Such compositions are also useful for coatings, castings and the like.

The following examples illustrate the invention, but it is to be understood that the scope of the invention is not to be construed as limited to details wherein the parts are by weight. The molecular weights reported herein were determined ebullioscopically in dichloroethane unless otherwise indicated.

Example I

This example illustrates the preparation of a copolymer of butadiene and allyl glycidyl ether and the use of the copolymer as a binder for solid rocket fuel.

The following components were charged to a stainless steel autoclave:

1500 parts of allyl glycidyl ether
7 parts of ditertiary butyl peroxide
200 parts of butadiene This mixture was heated to 150° C. and the following components added every hour for four hours: 200 parts of butadiene, 80 parts of allyl glycidyl ether and 7 parts of ditertiary butyl peroxide. The final product which was a dark yellow solution was distilled to yield a viscous resin which was identified as a copolymer of allyl glycidyl ether and butadiene and contained about 22% by weight of allyl glycidyl ether and 78% by weight butadiene. The copolymer had a molecular weight of 1615, an epoxy value of 0.15 eq./100 g. and a hydroxyl value of 0.02 eq./100 g.

110 parts of the above-described copolymer was combined with the 18 parts of dodecenyl succinic anhydride, 2 parts of magnesium oxide and 300 parts of ammonium perchlorate. This mixture was blended with stirring and cured at 80° C. for 48 hours. The resulting product was a casting having good strength and flexibility.

Example II

This example illustrates the preparation of a tripolymer of allyl glycidyl ether; butadiene and mesityl oxide and the use of this tripolymer as a binder for a solid rocket fuel.

The following materials were charged to a stainless steel reaction vessel:

100 parts of allyl glycidyl ether
500 parts of mesityl oxide
7 parts of ditertiary butyl peroxide
200 parts of butadiene The vessel was blanketed with nitrogen, heated to 150° C. and 200 parts of butadiene added continuously every hour for four hours. A mixture of 80 parts of mesityl oxide and 7 parts of ditertiary peroxide was also added every hour for four hours. At this conclusion of the reaction the product was distilled to yield a viscous amber color resin which was identified as a tripolymer containing 11% by weight allyl glycidyl ether, 78% by weight butadiene and 11% by weight mesityl oxide. The tripolymer had a molecular weight of 1250 and epoxy value of 0.076 eq./100 g. and iodine value of 374.

110 parts of the above-described tripolymer was combined with 18 parts of dodecenyl succinic anhydride, 2 parts of magnesium oxide and 300 parts of ammonium perchlorate. The mixture was blended with stirring and cured at 80° C. for 48 hours. The resulting product was a casting having good strength and flexibility.

Example III

This example illustrates the preparation of a copolymer of isoprene and allyl glycidyl ether and the use of the copolymer as a binder for solid fuel.

The following components were charged to a stainless steel reaction vessel:

1550 parts allyl glycidyl ether
7 parts ditertiary butyl peroxide
200 parts of isoprene The vessel was blanketed with nitrogen, heated to 150° C. and then the following materials added continuously every hour:

200 parts of isoprene, a mixture of 80 parts of allyl glycidyl ether and 7 parts of ditertiary butyl peroxide. At the end of the reaction the mixture was distilled to yield a fluid amber resin identified as a copolymer made up of about 77% by weight of isoprene units and 23% by weight of allyl glycidyl ether units. The resulting product was a resinous polymer having an epoxy value of 0.11 eq./100 g., a molecular weight of 3500 and viscosity of 25° C. of 360 poises.

110 parts of the above-identified copolymer was combined with 18 parts of dodecenyl succinic anhydride, 2 parts of magnesium oxide and 200 parts of ammonium percholate. This mixture was blended with stirring and cured at 80° C. for 48 hours. The resulting product was a casting having high tensile strength and good flexibility.

Example IV

To a stainless steel reactor are added the following components:

1550 parts allyl glycidyl ether
14 parts cumene hydroperoxide
200 parts butadiene The temperature of the vessel was raised to 110° C. and 200 parts of butadiene was added every hour for 4 hours. A mixture of 80 parts of allyl glycidyl ether and 7 parts of cumene hydroperoxide was also added every hour for 4 hours. At the end of the reaction period, the mixture was distilled to give an amber colored semi-solid resin identified as a copolymer of allyl glycidyl ether and butadiene. The copolymer had a molecular weight of 1410, an epoxy value of 0.247 eq./100 g. and an iodine number of 245.

110 parts of the above-described product is mixed with 18 parts of dodecenyl succinic anhydride and cured at 100° C. for several hours. The resulting product is a tough casting.

Example V

Examples I to IV are repeated with the exception that the butadiene and isoprene are replaced by 2-methylpentadiene. Related results are obtained.

Example VI

Examples I to IV are repeated with the exception that allyl glycidyl ether is replaced with methallyl glycidyl ether and vinyl glycidyl ether. Related results are obtained.

Example VII

Example III is repeated with the exception that the copolymer is cured with a copolymer of butadiene and acrylic acid (Hycar 2000 x 131). The resulting product had excellent flexibility.

Example VIII

Example VI is repeated with the exception that the copolymer is cured with a copolymer or butadiene and acrylic acid. Related results are obtained.

Example IX

To a 100 gallon reactor, 200 parts of allyl glycidyl ether and 200 parts of mesityl oxide were charged. This mixture was then heated to 140° C. at which time 6 parts of di-tertiary butyl peroxide catalyst was initially added and added at 2.5 parts per hour during the reaction period. The butadiene was then introduced as a gas into the reactor and the mixture held at 140° C. At the end of about 5 hours, the reactor was cooled to 90° C. and the unreacted butadiene vented off. The unreacted monomers were then stripped at full vacuum at 150° C., with nitrogen sparging. The resulting product was a resinous polymer having an epoxy value of 0.075 eq./100 g., a molecular weight of about 2600 and a viscosity at 25° C. of 250 poises.

Example X

Example IV was repeated with the exception that the butadiene was replaced with isoprene and the allyl glycidyl ether and mesityl oxide were used in a 1:1 mol ratio. The resulting product was a resinous polymer having an epoxy value of 0.079 eq./100 g., a molecular weight of 2200 and a viscosity of 260 poises at 25° C.

We claim as our invention:

1. A polyepoxide consiting of the addition polymer of an alkenyl vic-epoxy substiuted hydrocarbyl ether and a conjugated diolefin, said addition polymer being formed by polymerization through the ethylenic double bonds.
2. A polyepoxide consisting of the addition polymer of an alkenyl vic-epoxy substituted allyl ether and a conjugated diolefin, said addition polymer being formed by polymerization through the ethylenic double bonds.
3. A polyepoxide consisting of the addition polymer of an alkenyl glycidyl ether and a conjugated diene containing 4 to 8 carbon atoms, said addition polymer being formed by polymerization through the ethylenic double bonds.
4. A polyepoxide as in claim 3 wherein the conjugated diene is butadiene.
5. A polyepoxide as in claim 3 wherein the conjugated diene is isoprene.
6. A polyepoxide as in claim 3 wherein the alkenyl glycidyl ether is allyl glycidyl ether.
7. A polyepoxide consisting of the addition polymer from 10% to 80% by weight of allyl glycidyl ether, 1% to 70% by weight of a conjugated diene with the total weight being 100%, said addition polymer being formed by polymerization through the ethylenic double bonds.
8. A polyepoxide consisting of a terpolymer of an alkenyl glycidyl ether, a conjugated diolefin and mesityl oxide.
9. A copolymer of allyl glycidyl ether and butadiene.
10. A polyepoxide consisting of a terpolymer of allyl glycidyl ether, a conjugated diene and mesityl oxide.
11. A copolymer of allyl glycidyl ether and isoprene.
12. A polyepoxide consisting of an addition polymer of allyl glycidyl ether, butadiene and mesityl oxide, said addition polymer being formed by polymerization through the ethylenic double bonds.
13. A terpolymer of allyl glycidyl ether, isoprene and mesityl oxide.
14. A cured insoluble infusible product obtained by mixing and reacting the polyepoxide of claim 2 with an epoxy curing agent.
15. A cured insoluble infusible product obtained by mixing and reacting the polyepoxide of claim 2 with an amine curing agent.
16. A cured insoluble infusible product obtained by mixing and reacting the polyepoxide of claim 2 with a polybasic acid anhydride curing agent.

References Cited by the Examiner

UNITED STATES PATENTS

| | | | |
|---|---|---|---|
| 2,585,506 | 2/52 | Shokal et al. | 260—45.8 |
| 2,723,971 | 11/55 | Cupery | 260—2 |
| 2,839,514 | 6/58 | Shokal et al. | 260—80.3 |
| 3,040,010 | 6/62 | Shokal et al. | 260—63 |

OTHER REFERENCES

Marvel et al.: Indust. and Eng. Chem., vol. 45, No. 7 (1953), pp. 1532–38.

LEON J. BERCOVITZ, *Primary Examiner.*

HAROLD N. BURNSTEIN, DONALD E. CZAJA,
*Examiners.*